No. 608,798. Patented Aug. 9, 1898.
E. RUSS.
DEVICE FOR SUPPORTING BICYCLES.
(Application filed Dec. 28, 1897.)
(No Model.) 2 Sheets—Sheet 1.
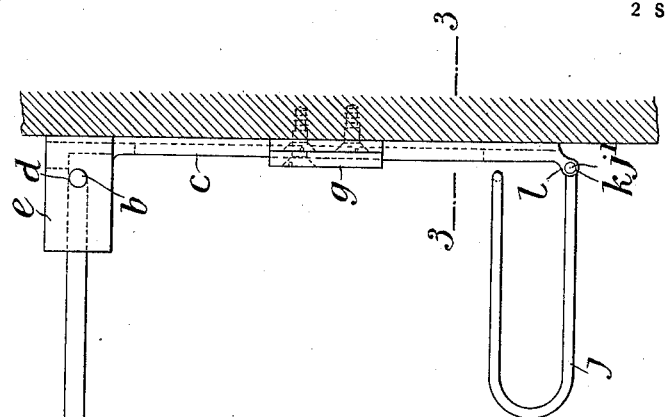
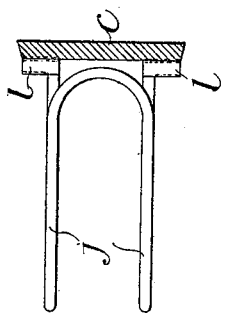
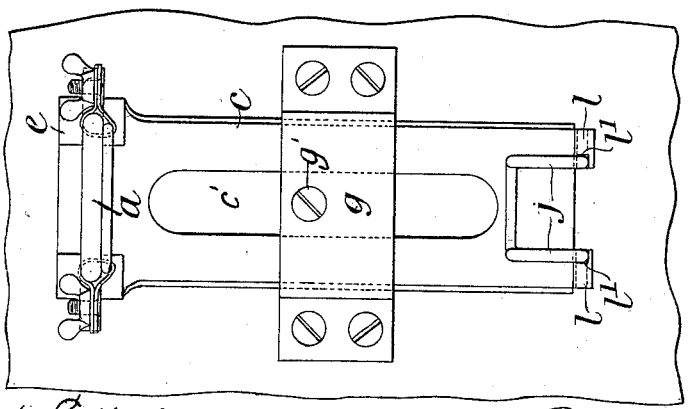
Witnesses.
Halbert Smith.
A. T. Hood.
Inventor
Edwin Russ.
By John J. Halsted & Son
his Attorneys.
THE NORRIS PETERS CO., PHOTO-LITHO., WASHINGTON, D. C.

No. 608,798. Patented Aug. 9, 1898.
E. RUSS.
DEVICE FOR SUPPORTING BICYCLES.
(Application filed Dec. 28, 1897.)
(No Model.) 2 Sheets—Sheet 2.
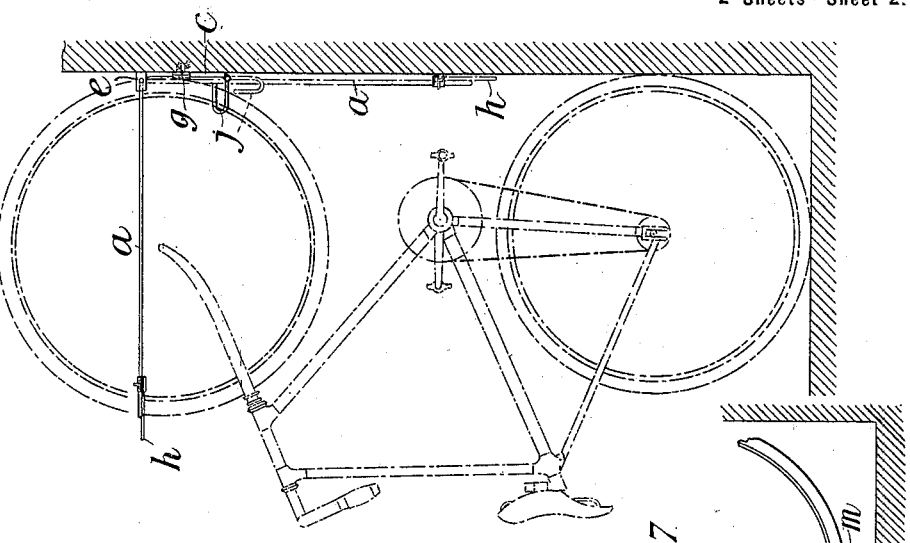
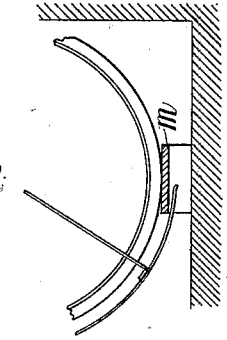
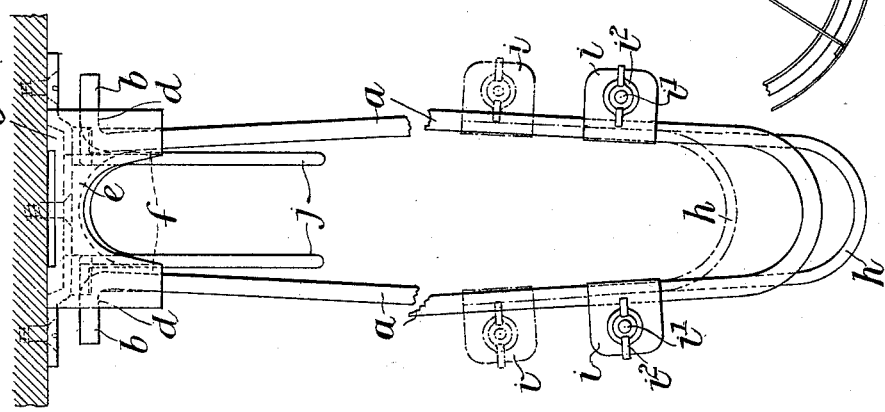
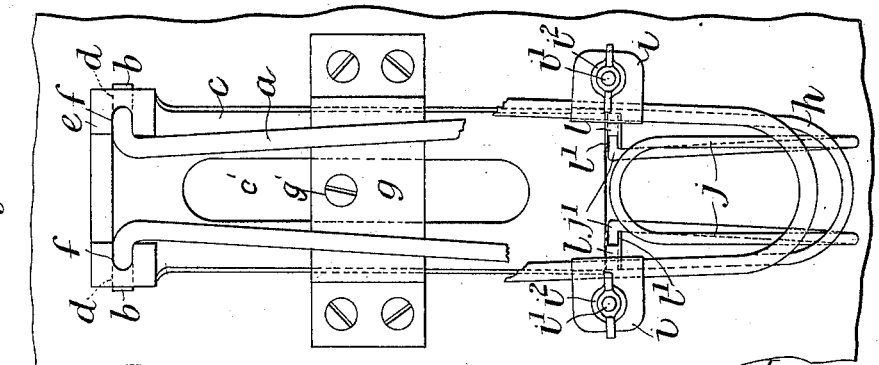

UNITED STATES PATENT OFFICE.

EDWIN RUSS, OF LONDON, ENGLAND.

DEVICE FOR SUPPORTING BICYCLES.

SPECIFICATION forming part of Letters Patent No. 608,798, dated August 9, 1898.

Application filed December 28, 1897. Serial No. 663,888. (No model.)

*To all whom it may concern:*

Be it known that I, EDWIN RUSS, a subject of the Queen of Great Britain, residing at Kew Gardens, London, in the county of Surrey, England, have invented a new and useful Improved Device for Supporting Bicycles, of which the following is a specification.

This invention relates to an improved device for supporting bicycles, and is particularly adapted for use in transporting bicycles on railways, but is also applicable for use in all other places where it is required to store such machines and where economy of space is an object.

My improved device consists of a clip in the form of a loop of a size such that it will clip or hold the wheel of a bicycle by the tire. My clip is hinged to a bracket or support fixed to the side of a railway-van or to the wall of a room or in any other suitable position; or where economy of space is not an object my device may be fixed to the floor. The bracket to which my clip is hinged is advantageously made to slide vertically, so that its height may be adjusted to suit different sizes of bicycles. The loop-clip is provided at its outer end with an adjustable additional loop in order that the device can be used for bicycles of different sizes, and the bracket or support is furnished at its lower end with a hinged spring-clip for further steadying the bicycle-wheel.

To enable my invention to be fully understood, I will describe it by reference to the accompanying drawings, in which—

Figure 1 is a front elevation of my improved device for supporting bicycles, showing the clips raised. Fig. 2 is a side elevation of the same. Fig. 3 is a section on the line 3 3, Fig. 2. Fig. 4 is a front elevation of the device with the clips lowered. Fig. 5 is a plan of the device, showing the clips raised. Fig. 6 is a side elevation, drawn to a smaller scale, showing the manner in which the device is used. Fig. 7 is a sectional view illustrating a method of supporting a machine having a mud-guard.

$a$ is the clip, which is made in the form of a loop from a length of steel wire, the ends $b\,b$ of which are bent outward at right angles to the loop, as clearly shown in Figs. 4 and 5. $c$ is the sliding bracket or support, to which the clip is hinged by means of its two outwardly-projecting ends $b\,b$, which engage in holes $d\,d$ in the sides of the head $e$ of the bracket $c$. The said head $e$ is provided with horizontal recesses $f\,f$, into which the two legs $a$ of the clip spring when the said clip is raised into a horizontal position.

The sliding bracket $c$ is placed on the side or end of a railway-van or on the wall of a room by means of the fixed or stationary guide $g$, in which the said bracket can slide vertically. This guide is secured, as shown, to the van or wall by proper fastenings, such as screws, and another screw $g'$, passed through a vertical slot $c'$ in this bracket $c$ and into the van or wall, serves to tighten the guide as need be against the face of the bracket to afford sufficient pressure or frictional contact with it to hold the bracket to any adjusted position.

$h$ is the additional loop provided at the outer end of the loop $a$, the said loop $h$ being secured to the loop $a$ by the clips $i\,i$, which are tightened by the screws $i'$ and thumb-nuts $i^2$. On loosening the nuts $i^2$ the loop $h$ can be adjusted in position, as shown in dotted lines, Fig. 5, for enabling the device to take a bicycle too small for the loop $a$.

$j$, Figs. 2, 3, and 4, is the hinged spring-clip, the outwardly-bent ends $j'$ of the same entering holes $k$ in lugs $l$ upon the lower end of the bracket $c$. Recesses or notches $l'$, into which the legs of the clip spring when the latter is raised into a horizontal position, serve to hold the clip in this position.

To make use of my device, the clip $a$ is raised from the position shown in Fig. 4 into a horizontal position, when the inner ends thereof will spring into and be held by the recesses $f\,f$ in the head $e$ of the bracket $c$, and the clip $j$ is also raised, so that its legs spring into the recesses $l'$ in the lugs $l$, as shown in Figs. 1, 2, and 6. The front wheel of the bicycle, which is in such a position that its long axis is vertical, is then passed under the loop $a$, (or loops $a$ and $h$,) the other wheel resting on the floor, as shown clearly in dotted lines in Fig. 6, so that the bicycle is securely held in its upright position by the clip $a$, the clip $j$ also serving to steady the wheel, as shown in Fig. 6.

In some cases, notably where bicycles having mud-guards are to be stored, I provide a support $m$ for the said bicycles, the said support being fixed to the floor and being of such a thickness that it can, if necessary, pass between the back wheel and the mud-guard, as shown in Fig. 7.

When my device is not in use, the clips $a$ and $j$ are sprung out of the recesses in which they are held and are placed flat against the bracket $c$, as shown in Figs. 4 and 6.

Having now particularly described and ascertained the nature of my said invention and in what manner the same is to be performed, I declare that what I claim is—

1. In combination, the clasping-guide $g$, secured to a wall, a vertically-slotted bracket $c$, embraced by such guide and adjustable up or down within it and held to its adjusted position by a screw passed through the guide and slot, the bracket having a projecting head $e$, as shown, with holes therein, and with recesses $f$, made therein as described for holding the loop-clip $a$ in its horizontal position.

2. In combination with the described fixed guide $g$, and the vertically-adjustable bracket $c$, held therein and thereby as set forth, and with the loop-clip $a$, applied to the projecting head $e$, of the bracket as shown and described, the spring-clip $j$, hinged to the bottom of the bracket, all as and for the purposes set forth.

EDWIN RUSS.

Witnesses:
   G. F. REDFERN,
   JOHN E. BOUSFIELD.